United States Patent
Kennedy et al.

(10) Patent No.: US 10,579,572 B2
(45) Date of Patent: Mar. 3, 2020

(54) APPARATUS AND METHOD TO PROVIDE A MULTI-SEGMENT I2C BUS EXERCISER/ANALYZER/FAULT INJECTOR AND DEBUG PORT SYSTEM

(71) Applicant: DELL PRODUCTS, LP, Round Rock, TX (US)

(72) Inventors: Jeffrey Kennedy, Austin, TX (US); Timothy M. Lambert, Austin, TX (US); Pablo R. Arias, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/041,203

(22) Filed: Jul. 20, 2018

(65) Prior Publication Data

US 2020/0026678 A1    Jan. 23, 2020

(51) Int. Cl.
    *G06F 13/40*    (2006.01)
(52) U.S. Cl.
    CPC ...... *G06F 13/4027* (2013.01); *G06F 13/4022* (2013.01); *G06F 2213/0016* (2013.01)
(58) Field of Classification Search
    CPC ............. G06F 13/4022; G06F 13/4027; G06F 2213/0016
    See application file for complete search history.

(56) References Cited

U.S. PATENT DOCUMENTS

| 6,233,635 | B1* | 5/2001 | Son ..................... G06F 13/4291 710/315 |
| 8,549,522 | B1* | 10/2013 | Chatterjee ........... G06F 11/3672 718/102 |
| 9,626,181 | B2* | 4/2017 | Liu ......................... G06F 8/66 |
| 10,275,330 | B2* | 4/2019 | Hirano ................ G06F 11/2236 |
| 2004/0117525 | A1 | 6/2004 | Lee |
| 2012/0173944 | A1* | 7/2012 | Pan ....................... G06F 11/221 714/734 |
| 2014/0344389 | A1* | 11/2014 | Hsieh .................... G06F 13/362 709/208 |
| 2015/0339249 | A1 | 11/2015 | Dharmadhikari et al. |
| 2018/0081776 | A1* | 3/2018 | Brown ................ G06F 11/2242 |
| 2018/0300273 | A1* | 10/2018 | Lambert ............... G06F 13/364 |

* cited by examiner

*Primary Examiner* — Nimesh G Patel
(74) *Attorney, Agent, or Firm* — Larson Newman, LLP

(57) ABSTRACT

A baseboard management controller (BMC) includes a plurality of device I2C interfaces. Each device I2C interfaces provides a device I2C bus that is ported externally to the BMC. The BMC further includes a plurality of device buffer/switch circuits. Each device buffer/switch circuit is connected to a respective device I2C bus, and is configured to selectably connect to the respective I2C bus in a high-impedance mode, an open-drain mode, and a FET switch mode. The BMC further includes a multiplexor/driver circuit that has a multiplexor I2C interface that provides a multiplexor I2C bus that is ported externally to the BMC. The multiplexor/driver circuit is coupled to each device I2C bus via the respective buffer/switch circuit, and is configured to selectively couple one of the device I2C busses to the multiplexor I2C bus, and to select one of the high-impedance mode, the open-drain mode, or the FET switch mode for the selected buffer/switch circuit.

20 Claims, 3 Drawing Sheets

APPARATUS AND METHOD TO PROVIDE A MULTI-SEGMENT I2C BUS EXERCISER/ANALYZER/FAULT INJECTOR AND DEBUG PORT SYSTEM

FIELD OF THE DISCLOSURE

This disclosure generally relates to information handling systems, and more particularly relates to providing a multi-segment I2C bus exerciser/analyzer/fault injector and debug port system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A baseboard management controller (BMC) may include a plurality of device I2C interfaces. Each device I2C interfaces may provide a device I2C bus that is ported externally to the BMC. The BMC may further include a plurality of device buffer/switch circuits. Each device buffer/switch circuit may be connected to a respective device I2C bus, and may be configured to selectably connect to the respective I2C bus in a high-impedance mode, an open-drain mode, and a FET switch mode. The BMC may further include a multiplexor/driver circuit that has a multiplexor I2C interface that may provide a multiplexor I2C bus that is ported externally to the BMC. The multiplexor/driver circuit may be coupled to each device I2C bus via the respective buffer/switch circuit, and may be configured to selectively couple one of the device I2C busses to the multiplexor I2C bus, and to select one of the high-impedance mode, the open-drain mode, or the FET switch mode for the selected buffer/switch circuit.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
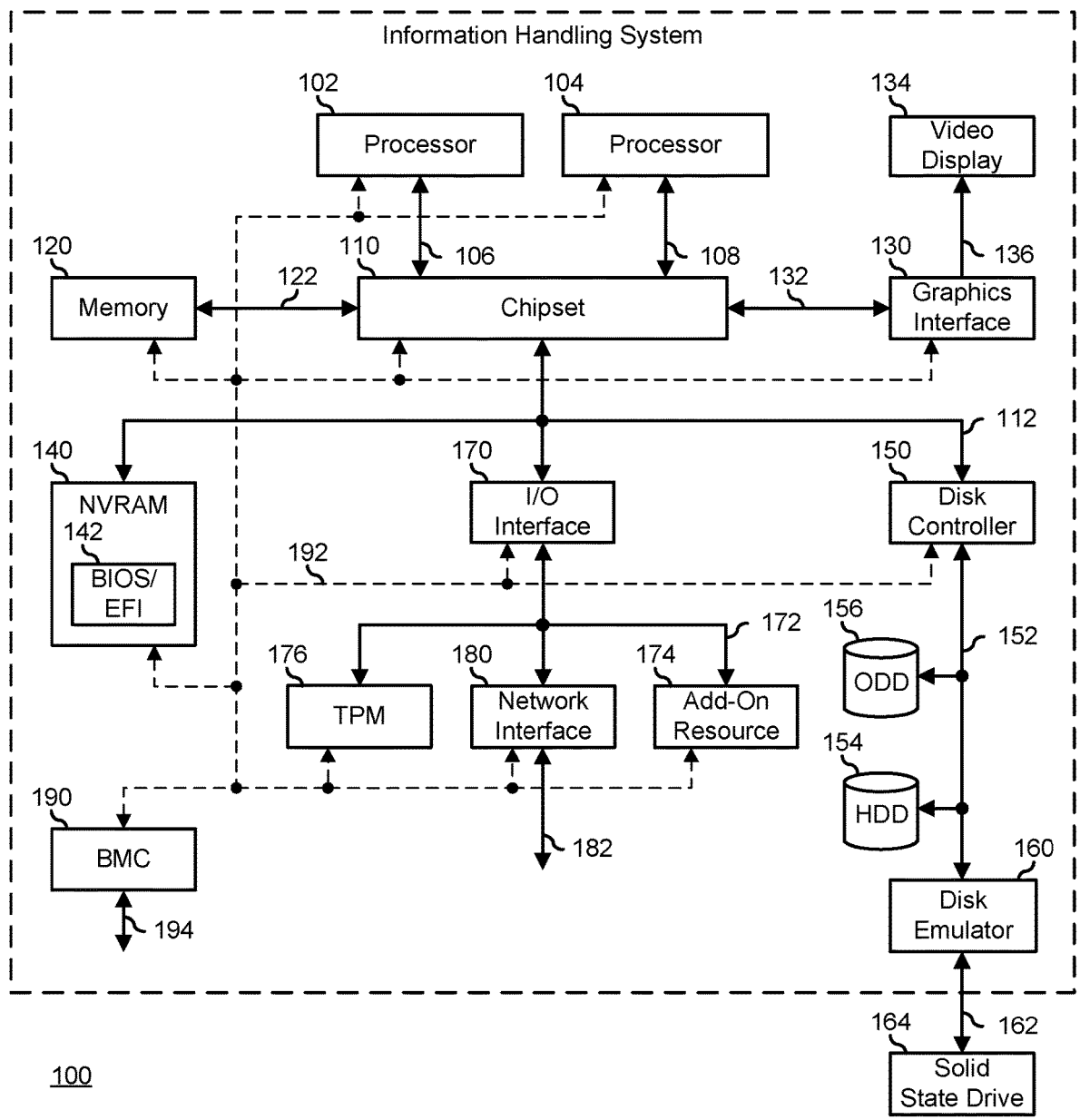
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like.

Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. An example of network channel 182 includes an InfiniBand channel, a Fibre Channel channel, a Gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 180 can vary considerably based on the type of information handling system. BMC 190 can operate in accordance with an Intelligent Platform Management Interface (IPMI). Examples of BMC 190 include an Integrated Dell Remote Access Controller (iDRAC). Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image. BMC 190 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 190, an interface defined by the Distributed Management Taskforce (DMTF) (e.g., a Web Services Management (WS-MAN) interface, a Management Component Transport Protocol (MCTP) or, a Redfish interface), various vendor defined interfaces (e.g., a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (e.g., a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

It will be understood that as the complexity of information handling system 100 increases, the number of interfaces represented by management interface 192, as well as the associated cost and complexity of the interfaces is likewise increasing. For example, it may be typical for management interface 192 to represent over 50 individual I2C bus interfaces and over 200 associated I2C bus master devices and slave devices on high density data processing products, such as blade server chassis, PCIe adapters, backplanes, and the like. It will also be understood that the ability to test, analyze, and debug the interactions and management activity occurring on such a high number of I2C interfaces and devices becomes increasingly difficult. One method of providing visibility to an I2C interface is to add a test header. However, the ability to add test headers to such a large number of I2C interfaces is limited by the amount of space taken by the headers on the printed circuit boards that make up information handling system 100.

Figure 2:
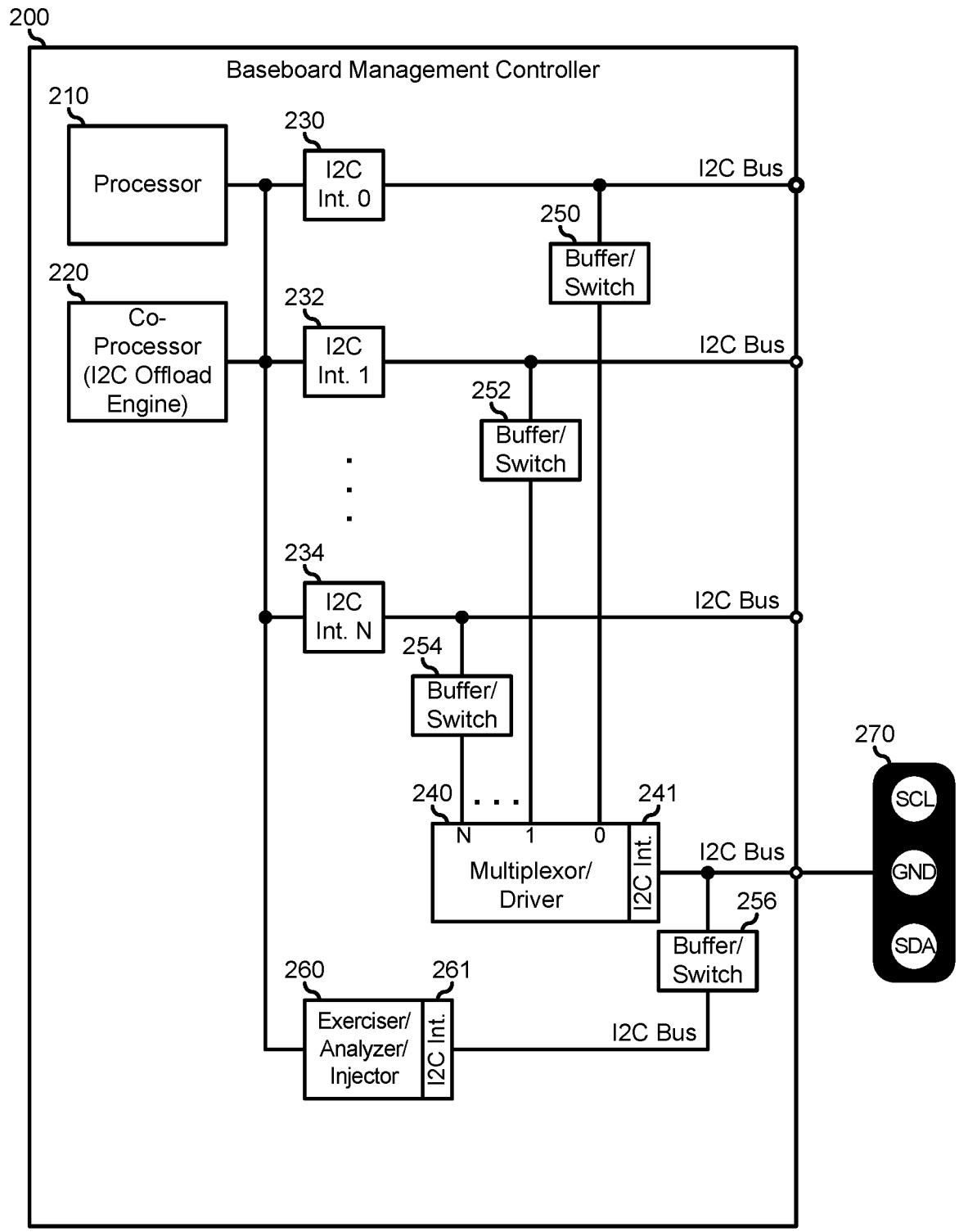
FIG. 2 is a block diagram of a baseboard management controller (BMC) according to an embodiment of the present disclosure.

FIG. 2 illustrates a BMC 200 similar to BMC 190, that provides for a single-point test access to multiple I2C segments, including targeted I2C bus exerciser, analyzer, and fault injection functions. BMC 200 includes a processor 210, a co-processor 220, I2C interfaces 230, 232, and 234, a multiplexor/driver module 240, buffer/switch modules 250, 252, 254, and 256, and a bus exerciser, analyzer, and fault injection (EAF) module 260. BMC 200 is representative of a complex, and multi-purposed device that can be implemented as a System-on-a-Chip (SoC) that includes other elements, such as RAM or NV-RAM, that allow the BMC to operate independently from other elements of the information handling system into which the BMC is incorporated. As such, processor 210 represents a central processing unit (CPU) of BMC 200 that operates to execute code to perform the various tasks, functions, and operations as described herein. An example of processor 210 may include a processor that implements a particular processor architecture, such as an ARM dual-core Cortex A9 processor, or the like. While processor 210 may be characterized as being a powerful multi-purpose processor, and the processor may typically run a particular OS, such as a Linux-based OS, nevertheless, the operational demands of BMC 200 may be such that additional targeted processing support is deemed necessary to handle specific workloads of the BMC. In this case, co-processor 220 operates at a higher real-time rate to provide an I2C offload engine for BMC 200, handling on the order of 70,000 interrupts per second.

I2C interfaces 230, 232, and 234 represent the multiple I2C interfaces supported by BMC 200. In a particular embodiment, I2C interfaces 230, 232, and 234 are representative of 38 or more individual I2C interfaces that are instantiated on BMC 200, and that are ported externally to the BMC to be connected to the various devices and endpoints of the information handling system into which the BMC is incorporated. Example devices and endpoints may include the elements of information handling system 100 as shown in FIG. 1, a server or blade chassis backplane, various status and display controllers, Non-Volatile Memory-Express (NVMe) devices, or other elements of an information handling system, as needed or desired. I2C interfaces 230, 232, and 234 may be operated in various modes and topologies. For example, I2C interfaces 230, 232, and 234 may be operated as master-slave interfaces, multi-master interfaces, master-request interfaces, master-response interfaces, or the like. Further, each of I2C interfaces 230, 232, and 234 may operate at various bus speeds, as needed or desired. I2C interfaces 230, 232, and 234 are coupled to processor 210, co-processor 220, and EAF module 260 via a high-speed internal interface. Further, I2C interfaces 230, 232, and 234 are ported externally to BMC 200, typically as three-wire interfaces that include a ground pin (GND), a data pin (SDA), and a clock pin (SCL).

Co-processor 220 operates to manage data interactions between I2C interfaces 230, 232, and 234, and the devices and endpoints to which they are connected, offloading the detailed transactions from processor 220. As such, co-processor 220 provides various APIs for sending and receiving management information from the devices and endpoints, and includes mailboxes and buffers for managing data flows and accumulating management information for use by processor 210 in managing the information handling system into which BMC 200 is incorporated. In particular, co-processor 220 can operate to flag transactions to one or more particular I2C interfaces, and can redirect the traffic associated with the one or more particular I2C interface to one or more different I2C interfaces, as needed or desired.

Multiplexor/driver module 240 provides for flexible access and interactions between I2C interfaces 230, 232, and 234, and provides for a single-point test access to the I2C interfaces. Multiplexor/driver module 240 is connected to the I2C busses associated with I2C interfaces 230, 232, and 234 via respective buffer/switch modules 250, 252, and 254. Buffer/switch modules 250, 252, and 254 each operate to connect multiplexor/driver module 240 to their respective I2C busses in three different modes. In a first mode, buffer/switch modules 250, 252, and 254 are connected to their respective I2C busses via a high-impedance connection. In the high-impedance mode, multiplexor/driver 240 operates to monitor the signals on the I2C busses, without injecting noise onto the I2C busses. Here, multiplexor/driver 240 can monitor the signals on one or more of the I2C busses and buffer transactions as needed or desired. In a second mode, buffer/switch modules 250, 252, and 254 are connected to their respective I2C busses via an open-drain connection. In the open-drain mode, multiplexor/driver module 240 is enabled to inject signals onto the I2C busses. In a third mode, buffer/switch modules 250, 252, and 254 are connected to their respective I2C busses via a FET switch. Here, multiplexor/driver 240 can monitor the analog signals that are being transmitted on the I2C busses. Multiplexor/driver 240 is connected to each of buffer/switch modules 250, 252, and 254 in such a way as to provide control signals to the buffer/switch modules, to select between the operating modes, and also to provide I2C bus communications between the multiplexor/driver and the associated I2C interfaces. As such, the connections between multiplexor/driver 240 and buffer/switch modules 250, 252, and 254 may include a three-wire I2C bus interface, and one or more control signals, as needed or desired.

Multiplexor/driver module 240 includes an I2C interface 241 that is ported externally to BMC 200, as three-wire interface to a 3-pin connector 270 that is external to the BMC. Connector 270 includes a ground pin (GND), a data pin (SDA), and a clock pin (SCL). In this way, a user of the information handling system into which BMC 200 is incorporated can have test access to each of the I2C busses. For example, where the user installs a digital signal analyzer onto connector 270, the analyzer can provide I2C interactions with I2C interface 241 to direct multiplexor/driver module 240 to place one or more of buffer/switches 250, 252, and 254 into the high-impedance mode, and then the data traffic from the selected I2C interface can be monitored by the external signal analyzer. In particular, the signal analyzer can include a protocol analyzer to determine if the signals on the I2C busses are in conformance with a particular I2C bus specification. For example, a protocol analyzer can determine if proper addresses are utilized, if correct start- and stop-bits are issued, if data is properly formatted, and the like.

In another example, where a user installs a bus exerciser onto connector 270, the bus exerciser can provide I2C interactions with I2C interface 241 to direct multiplexor/driver module 240 to place one or more of buffer/switches 250, 252, and 254 into the open-drain mode, and then the bus exerciser can inject data traffic onto the selected I2C interface, for example to test the robustness of BMC 200 or the connected devices or endpoints to handle various input scenarios. Further, the bus exerciser can be configured to inject faulty signals onto the I2C busses to test the ability of BMC 200 or the connected devices or endpoints to handle the faults. For example, a bus exerciser can inject bad operations or bad addresses, can inject transactions, and the like.

In a third example, where the user installs an analog signal analyzer onto connector 270, the analog analyzer can provide I2C interactions with I2C interface 241 to direct multiplexor/driver module 240 to place one or more of buffer/switches 250, 252, and 254 into the switched mode, and then the analog signals from the selected I2C interface can be monitored by the external signal analyzer. Further, the analog signal analyzer can be configured to inject faulty analog signals onto the I2C busses to test the robustness of the signal integrity of BMC 200 and the connected devices and endpoints. For example, an analog signal analyzer can evaluate bus hang and bus recovery mechanisms, detect clock unraveling, inject or detect false ACK, false NACK, detect and inject set-up and hold times, and the like.

EAF module 260 operates internally to BMC 200 to provide targeted I2C bus exerciser, analyzer, and fault injection functions. In particular, EAF module 260 can operate similarly to the external bus exerciser, analyzer, and fault injector as described above. Here, EAF module 260 includes an I2C interface 260 that is connected to the external I2C bus associated with I2C interface 241 via buffer/switch module 256. In this way, EAF module 260 can be connected to any of the I2C busses in the same way that external devices can.

Figure 3:
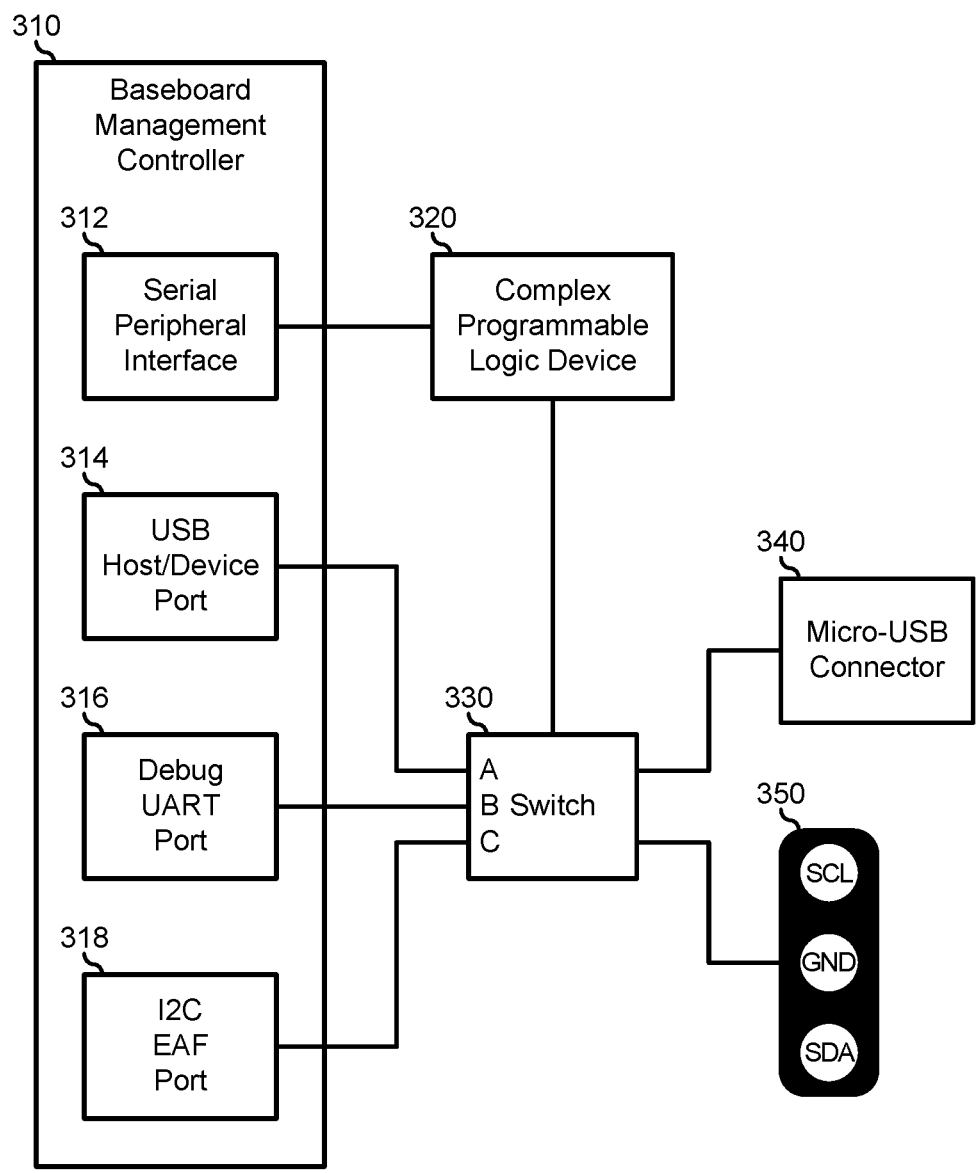
FIG. 3 is a block diagram of a debug port system according to an embodiment of the present disclosure.

FIG. 3 illustrates a debug port system 300 for an information handling system. Debug port system 300 includes a BMC 310, a complex programmable logic device (CPLD) 320, a debug switch 330, a micro-USB connector 340, and a connector 350. BMC 310 is similar to BMC 200, and includes a Serial Peripheral Interconnect (SPI) module 312, a USB host/device port 314, a debug Universal Asynchronous Receiver/Transmitter (UART) port 316 and an I2C EAF port 318. Debug switch 330 operates to selectively switch one of connectors 340 and 350 to one of ports 314, 316, and 318, as needed or desired. SPI module 312 is connected to CPLD 320 to provide control signals to the CPLD to control the switching behavior of debug switch 330. The switching behavior of debug switch 330 is controlled in accordance with an agreed-upon framework between a manufacturer of the information handling system that incorporates debug port system 300, and a user of the information handling system. In particular, the manufacturer can establish a Field Service Debug Authorization Facility (FSDAF) that operates as a certificate authority to permit the downloading of various certificates by BMC 310, the certificates prescribing the level of debug access to the information handling system to which the user is authorized. For example, when the user encounters a failure that is related to one of the many I2C interfaces on the information handling system, the user may inform the manufacturer of the failure, and the manufacturer may provide a certificate that authorizes SPI module 312 to direct CPLD 320 to establish a connection between connector 350 and I2C EAF port 318, and that enables EAF functions of BMC 310 similar to those described with respect to FIG. 2, above. In this way, the user and the manufacturer can coordinate efforts to debug the failure and more quickly arrive at a solution. In another example, debug port system 300 can be configured in a default mode where micro-USB connector 340 is connected via debug switch 330 to USB host/device port 314. Here, USB host/device port 314 can determine whether or not a USB device is plugged into micro-USB connector 340, and if so, the USB host/device port can operate as a USB host to host USB transactions with the USB device. Further, USB host/device port 314 can determine whether or not a USB host is plugged into micro-USB connector 340, and if so, the USB host/device port can operate as a USB device to receive and respond to USB transactions from the USB host.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A baseboard management controller, comprising:
    a plurality of device I2C interfaces, each device I2C interface configured to provide a device I2C bus that is ported externally to the baseboard management controller;
    a plurality of device buffer/switch circuits, each device buffer/switch circuit being connected to a respective one of the device I2C busses, and configured to selectably connect to the respective I2C bus in a high-impedance mode, an open-drain mode, and a FET switch mode; and
    a multiplexor/driver circuit including a multiplexor I2C interface that provides a multiplexor I2C bus that is ported externally to the baseboard management controller, wherein the multiplexor/driver circuit is coupled to each device I2C bus via the respective buffer/switch circuit, and is configured to selectively couple one of the device I2C busses to the multiplexor I2C bus, and to select one of the high-impedance mode, the open-drain mode, or the FET switch mode for the selected buffer/switch circuit.

2. The baseboard management controller of claim 1, wherein the multiplexor/driver circuit is configured to receive a command on the multiplexor I2C bus, the command identifying a particular device I2C bus and the high-impedance mode, to select a buffer/switch circuit associated with the identified device I2C bus, and to select the high-impedance mode for the selected buffer switch circuit, whereby an analyzer coupled to the multiplexor I2C bus operates to monitor traffic on the identified I2C bus.

3. The baseboard management controller of claim 1, wherein the multiplexor/driver circuit is configured to receive a command on the multiplexor I2C bus, the command identifying a particular device I2C bus and the open-drain mode, to select a buffer/switch circuit associated with the identified device I2C bus, and to select the open-drain mode for the selected buffer switch circuit, whereby an analyzer coupled to the multiplexor I2C bus operates to inject traffic on the identified I2C bus.

4. The baseboard management controller of claim 1, wherein the multiplexor/driver circuit is configured to receive a command on the multiplexor I2C bus, the command identifying a particular device I2C bus and the FET-switch mode, to select a buffer/switch circuit associated with the identified device I2C bus, and to select the FET-switch mode for the selected buffer switch circuit, whereby an analyzer coupled to the multiplexor I2C bus operates to trace a first analog signal on the identified I2C bus.

5. The baseboard management controller of claim 4, whereby further, the analyzer operates to inject a second analog signal on the identified I2C bus.

6. The baseboard management controller of claim 1, further comprising;
    a multiplexor buffer/driver circuit connected to the multiplexor I2C bus, and configured to selectably connect to the multiplexor I2C bus in the high-impedance mode, the open-drain mode, and the FET switch mode an exerciser/analyzer/fault-injector (EAF) circuit coupled to the data communication interface and including an EAF I2C interface connected to the multiplexor buffer/driver circuit, wherein the EAF circuit is configured to selectively couple the EAF circuit to the multiplexor I2C bus, and to select one of the high-impedance mode, the open-drain mode, or the FET switch mode for the multiplexor buffer/switch circuit.

7. The baseboard management controller of claim 6, wherein the multiplexor/driver circuit is configured to receive a command on the multiplexor I2C bus from the EAF circuit, the command identifying a particular device I2C bus and the high-impedance mode, to select a buffer/switch circuit associated with the identified device I2C bus, and to select the high-impedance mode for the selected buffer switch circuit, and wherein the EAF circuit operates to monitor traffic on the identified I2C bus.

8. The baseboard management controller of claim 6, wherein the multiplexor/driver circuit is configured to receive a command on the multiplexor I2C bus from the EAF circuit, the command identifying a particular device I2C bus and the open-drain mode, to select a buffer/switch circuit associated with the identified device I2C bus, and to select the open-drain mode for the selected buffer switch circuit, and wherein the EAF circuit operates to inject traffic on the identified I2C bus.

9. The baseboard management controller of claim 6, wherein the multiplexor/driver circuit is configured to receive a command on the multiplexor I2C bus from the EAF circuit, the command identifying a particular device I2C bus and the FET-switch mode, to select a buffer/switch circuit associated with the identified device I2C bus, and to select the FET-switch mode for the selected buffer switch circuit, and wherein the EAF circuit operates to trace a first analog signal on the identified I2C bus.

10. The baseboard management controller of claim 9, wherein the EAF circuit further operates to inject a second analog signal on the identified I2C bus.

11. A method, comprising:
providing, by a plurality of device I2C interfaces of a baseboard management controller, respective device I2C buses, each device I2C bus being ported externally to the baseboard management controller;
connecting each one of the I2C busses to a respective device buffer/switch circuit, each device buffer/switch circuit configured to selectably connect to the respective I2C bus in a high-impedance mode, an open-drain mode, and a FET switch mode;
connecting each device buffer/switch circuit to a multiplexor/driver circuit, wherein the multiplexor/driver circuit includes a multiplexor I2C interface that provides a multiplexor I2C bus that is ported externally to the baseboard management controller; and
receiving, by the multiplexor/driver circuit, a command to selectively couple one of the device I2C busses to the multiplexor I2C bus, and to select one of the high-impedance mode, the open-drain mode, or the FET switch mode for the selected buffer/switch circuit.

12. The method of claim 11, further comprising:
receiving, by the multiplexor/driver circuit, a first command on the multiplexor I2C bus, the command identifying a particular device I2C bus and the high-impedance mode;
selecting, by the multiplexor/driver circuit, a buffer/switch circuit associated with the identified device I2C bus;
selecting, by the multiplexor/driver circuit, the high-impedance mode for the selected buffer switch circuit; and
monitoring, by an analyzer coupled to the multiplexor I2C bus, traffic on the identified I2C bus.

13. The method of claim 11, further comprising:
receiving, by the multiplexor/driver circuit, a first command on the multiplexor I2C bus, the command identifying a particular device I2C bus and the open-drain mode;
selecting, by the multiplexor/driver circuit, a buffer/switch circuit associated with the identified device I2C bus;
selecting, by the multiplexor/driver circuit, the open-drain mode for the selected buffer switch circuit; and
injecting, by an analyzer coupled to the multiplexor I2C bus, traffic on the identified I2C bus.

14. The method of claim 11, further comprising:
receiving, by the multiplexor/driver circuit, a first command on the multiplexor I2C bus, the command identifying a particular device I2C bus and the FET-switch mode;
selecting, by the multiplexor/driver circuit, a buffer/switch circuit associated with the identified device I2C bus;
selecting, by the multiplexor/driver circuit, the FET-switch mode for the selected buffer switch circuit; and
tracing, by an analyzer coupled to the multiplexor I2C bus, a first analog signal on the identified I2C bus.

15. The method of claim 14, further comprising:
injecting, by the analyzer, a second analog signal on the identified I2C bus.

16. The method of claim 11, further comprising:
connecting a multiplexor buffer/driver circuit to the multiplexor I2C bus, the multiplexor buffer/driver configured to selectably connect to the multiplexor I2C bus in the high-impedance mode, the open-drain mode, and the FET switch mode;
coupling an exerciser/analyzer/fault-injector (EAF) I2C interface from an EAF circuit to the multiplexor buffer/driver circuit;
selecting, by the EAF circuit, to couple the EAF I2C interface to the multiplexor I2C bus in one of the high-impedance mode, the open-drain mode, or the FET switch mode for the multiplexor buffer/switch circuit.

17. The method of claim 16, further comprising:
receiving, by the multiplexor/driver circuit from the EAF circuit, a first command identifying a particular device I2C bus and the high-impedance mode;
selecting, by the multiplexor/driver circuit, a buffer/switch circuit associated with the identified device I2C bus;
selecting, by the multiplexor/driver circuit, the high-impedance mode for the selected buffer switch circuit; and
monitoring, by the EAF circuit, traffic on the identified I2C bus.

18. The method of claim 16, further comprising:
receiving, by the multiplexor/driver circuit from the EAF circuit, a first command identifying a particular device I2C bus and the open-drain mode;
selecting, by the multiplexor/driver circuit, a buffer/switch circuit associated with the identified device I2C bus;
selecting, by the multiplexor/driver circuit, the open-drain mode for the selected buffer switch circuit; and injecting, by the EAF circuit, traffic on the identified I2C bus.

19. The method of claim 16, further comprising:
receiving, by the multiplexor/driver circuit from the EAF circuit, a first command identifying a particular device I2C bus and the FET-switch mode;
selecting, by the multiplexor/driver circuit, a buffer/switch circuit associated with the identified device I2C bus;
selecting, by the multiplexor/driver circuit, the FET-switch mode for the selected buffer switch circuit;
tracing, by the EAF circuit, a first analog signal on the identified I2C bus; and
injecting, by the EAF circuit, a second analog signal on the identified I2C bus.

20. An information handling system, comprising:
a plurality of devices, each device operably coupled to a respective device I2C bus; and
a baseboard management controller, including:
   a plurality of device I2C interfaces, each device I2C interfaces configured to provide a device I2C bus that is ported externally to the baseboard management controller and coupled to a respective one of the devices;
   a plurality of device buffer/switch circuits, each device buffer/switch circuit being connected to a respective one of the device I2C busses, and configured to selectably connect to the respective I2C bus in a high-impedance mode, an open-drain mode, and a FET switch mode; and
   a multiplexor/driver circuit including a multiplexor I2C interface that provides a multiplexor I2C bus that is ported externally to the baseboard management controller, wherein the multiplexor/driver circuit is coupled to each device I2C bus via the respective buffer/switch circuit, and is configured to selectively couple one of the device I2C busses to the multiplexor I2C bus, and to select one of the high-impedance mode, the open-drain mode, or the FET switch mode for the selected buffer/switch circuit.

* * * * *